(12) United States Patent
Shen et al.

(10) Patent No.: US 8,131,938 B2
(45) Date of Patent: *Mar. 6, 2012

(54) ADAPTIVE MECHANISMS AND METHODS FOR SUPPLYING VOLATILE DATA COPIES IN MULTIPROCESSOR SYSTEMS

(75) Inventors: Xiaowei Shen, Hopewell Junction, NY (US); Man Cheuk Ng, Cambridge, MA (US); Aaron Christoph Sawdey, Cannon Falls, MN (US)

(73) Assignee: International Business Machines Corporation, Armonk, NY (US)

( * ) Notice: Subject to any disclaimer, the term of this patent is extended or adjusted under 35 U.S.C. 154(b) by 512 days.

This patent is subject to a terminal disclaimer.

(21) Appl. No.: 12/248,209

(22) Filed: Oct. 9, 2008

(65) Prior Publication Data
US 2009/0043966 A1   Feb. 12, 2009

Related U.S. Application Data

(63) Continuation of application No. 11/458,192, filed on Jul. 18, 2006, now Pat. No. 7,478,197.

(51) Int. Cl.
*G06F 12/00* (2006.01)
(52) U.S. Cl. ........ 711/137; 711/117; 711/143; 711/204; 711/E12.008
(58) Field of Classification Search .......... 711/117, 711/137, E12.024, 204, 143
See application file for complete search history.

(56) References Cited

U.S. PATENT DOCUMENTS

| 7,478,197 | B2 * | 1/2009 | Shen et al. .............. 711/117 |
| 2007/0088915 | A1 * | 4/2007 | Archambault et al. ....... 711/137 |
| 2007/0204137 | A1 * | 8/2007 | Tran ........................ 712/214 |

* cited by examiner

*Primary Examiner* — Kevin Ellis
*Assistant Examiner* — Mehdi Namazi
(74) *Attorney, Agent, or Firm* — Whitham, Curtis, Christofferson & Cook, P.C.; Daniel P. Morris

(57) ABSTRACT

In a computer system with a memory hierarchy, when a high-level cache supplies a data copy to a low-level cache, the shared copy can be either volatile or non-volatile. When the data copy is later replaced from the low-level cache, if the data copy is non-volatile, it needs to be written back to the high-level cache; otherwise it can be simply flushed from the low-level cache. The high-level cache can employ a volatile-prediction mechanism that adaptively determines whether a volatile copy or a non-volatile copy should be supplied when the high-level cache needs to send data to the low-level cache. An exemplary volatile-prediction mechanism suggests use of a non-volatile copy if the cache line has been accessed consecutively by the low-level cache. Further, the low-level cache can employ a volatile-promotion mechanism that adaptively changes a data copy from volatile to non-volatile according to some promotion policy, or changes a data copy from non-volatile to volatile according to some demotion policy.

12 Claims, 5 Drawing Sheets

Figure 1 – CMP with a shared L3 cache

Figure 2 – CMP with multiple L3 caches

ADAPTIVE MECHANISMS AND METHODS FOR SUPPLYING VOLATILE DATA COPIES IN MULTIPROCESSOR SYSTEMS

RELATED APPLICATION

This application is a continuation of U.S. patent application Ser. No. 11/458,192 having the same title and filed on Jul. 18, 2006, now matured into U.S. Pat. No. 7,478,197, which is incorporated by reference.

GOVERNMENT RIGHTS

This invention was made with government support under Contract No. NBCHC020056 awarded by Defense Advanced Research Projects Agency (DARPA). The government has certain rights in this invention.

DESCRIPTION

Background of the Invention

1. Field of the Invention

The present invention generally relates to a method for exchanging cached data within multiprocessor systems and, more particularly, to the interaction between cache memory components in the memory hierarchy in multiprocessor systems such as Chip Multiprocessor (CMP) systems and Symmetric Multiprocessor (SMP) systems. The invention comprises a prediction mechanism for determining whether a volatile or non-volatile data copy should be provided when a cache needs to supply data to another cache.

2. Background Description

Memory access latency has been a serious performance bottleneck in modern computer systems. As processor speeds continue at a much higher rate than memory speeds, memory access latency may soon approach a thousand processor cycles.

Caching is a common technique to reduce effective memory access latency. A processor can access a cache faster than the main memory because, compared with the main memory, a cache generally is closer to the accessing processor, usually has a smaller size, and typically uses faster device technology. Traditionally, the main memory is implemented using dynamic random access memory (DRAM), and a cache is implemented using static random access memory (SRAM). In recent years, embedded DRAM (eDRAM) has seen its use in cache implementations (e.g. off-chip L3 caches in the IBM Power4 multiprocessor system).

Conceptually, a cache can reduce memory access latency by taking advantage of temporal and spatial locality in programs. To exploit spatial locality, a cache is typically organized in multi-byte cache lines. To exploit temporal locality, a cache usually employs an appropriate replacement algorithm such as the least-recently-used (LRU) policy or pseudo-LRU replacement policy to keep recently used data in the cache.

A modern computer system typically uses a memory hierarchy that comprises the main memory and multiple levels of caches. For a processor, an L1 (level 1) cache is at the lowest level of the memory hierarchy and is closest to the processor. An L1 cache is almost always on the same chip with the CPU (central processing unit) so that it can be accessed by the CPU with very short access latency. Sometimes an L1 cache is partitioned into an instruction cache and a data cache.

SUMMARY OF THE INVENTION

In a computer system with a memory hierarchy, when a high-level cache supplies a data copy to a low-level cache, the shared copy can be either volatile or non-volatile. When the data copy is later replaced from the low-level cache, if the data copy is non-volatile, it needs to be written back to the high-level cache; otherwise it can be simply flushed from the low-level cache. The high-level cache can employ a volatile-prediction mechanism that adaptively determines whether a volatile copy or a non-volatile copy should be supplied when the high-level cache needs to send data to the low-level cache. An exemplary volatile-prediction mechanism suggests use of a non-volatile copy if the cache line has been accessed consecutively by the low-level cache. The low-level cache can employ a volatile-promotion mechanism that adaptively promotes a data copy from volatile to non-volatile, or demotes a data copy from non-volatile to volatile.

One embodiment of the invention is to provide a system for adaptively supplying volatile or non-volatile data copies in a computing environment. In this embodiment, multiple memory components are configured in a memory hierarchy. An interconnection between the memory components allows the memory components to communicate with one another. A prediction mechanism is used to determine, when a first memory component supplies a data copy of a memory address to a second memory component, whether the data copy is volatile or non-volatile. The memory components can be at the same level or at different levels in the memory hierarchy.

Another embodiment of the invention is to provide a system for adaptively promoting data copies from volatile to non-volatile in a computing environment. This embodiment includes a memory hierarchy with high-level and low-level caches with an interconnection that permits the high-level and low-level caches to communicate with each other. A promotion mechanism, operationally associated with the low-level cache, determines whether the cache line in the low-level cache should be promoted from volatile to non-volatile, or demoted from non-volatile to volatile.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

In a multiprocessor system such as a CMP (chip multiprocessor) system or a SMP (symmetric multiprocessor system), each CPU typically has its own private L1 cache. For the purpose of the present invention, a CPU together with its private L1 cache is referred to as a CPU core. One or more L1 caches can share an L2 (level 2) cache. Likewise, one or more L2 caches may share an L3 (level 3) cache. An L2 or L3 cache can be either on the same chip with an accessing CPU core, or on a different chip.

Address inclusion can be enforced between caches at adjacent levels in the memory hierarchy. For example, the system generally maintains address inclusion between an L1 cache and its corresponding L2 cache in the sense that, if an address is cached in the L1 cache, the address must be cached in the L2 cache. This allows cache coherence to be implemented at the L2 cache level without generating L1 cache snoop operations. Whether address inclusion is maintained between L2 and L3 caches can be implementation-dependent. For example, the system may choose not to maintain address inclusion between an L2 cache and its corresponding L3 cache, if the L3cache is not much larger than the L2 cache. This is because maintaining address inclusion would imply ineffective use of the L3 cache due to data replication between the L2 and L3 caches.

Figure 1:
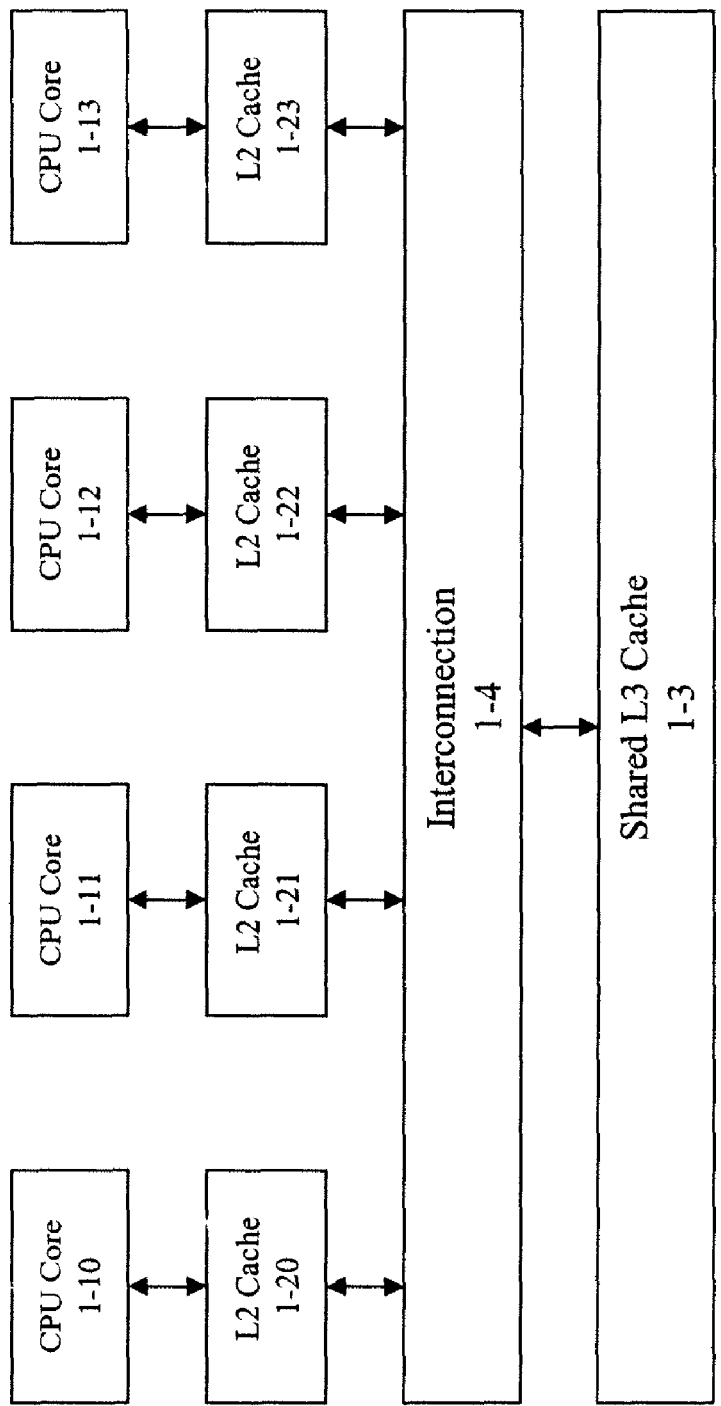
FIG. 1 is an exemplary CMP system with a shared L3 cache.

Referring now to FIG. 1, an exemplary CMP system comprises four CPU cores (1-10, 1-11, 1-12, and 1-13), wherein each CPU core accesses a private L2 cache (1-20, 1-21, 1-22, and 1-23). The CPU core includes a CPU and an L1 cache (not shown) that is directly accessed by the CPU. The interconnection 1-4 provides communication channels that allow the L2 caches to access a shared L3 cache 1-3. If the shared L3 cache is big, its access latency can be quite high.

Figure 2:
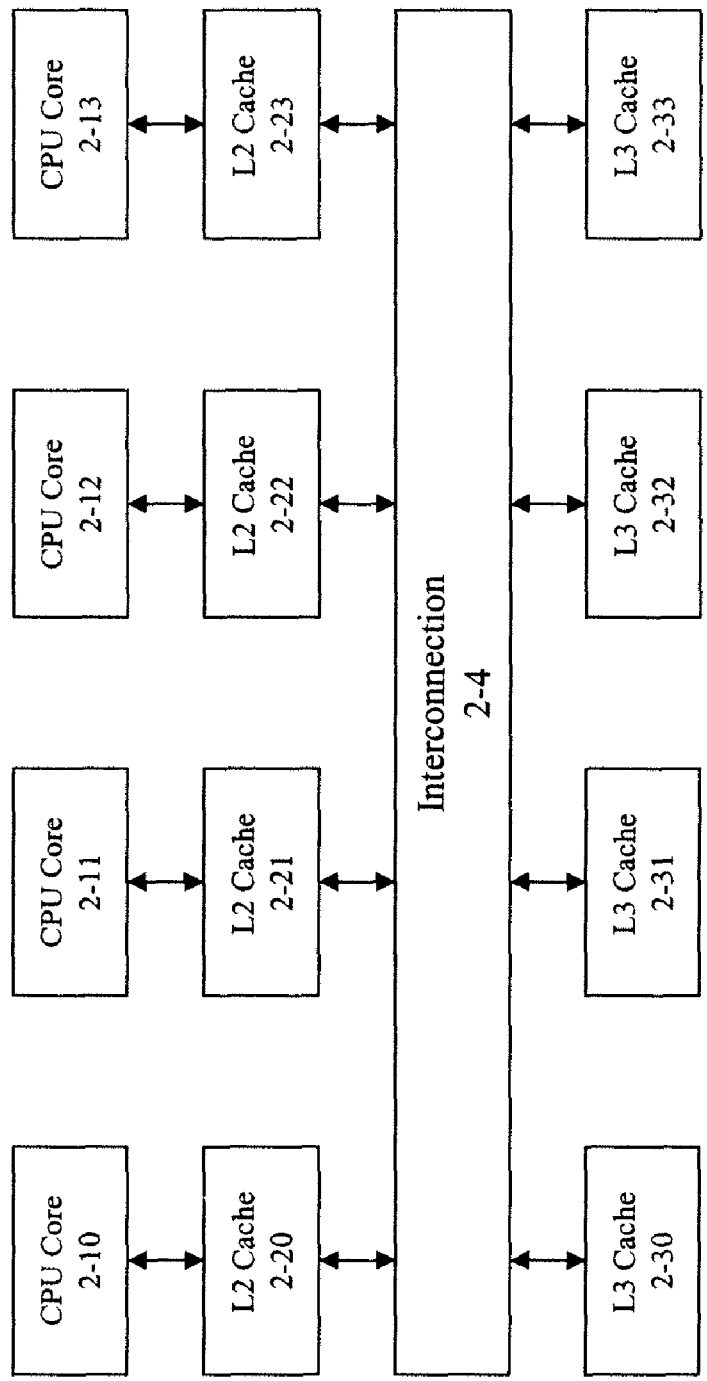
FIG. 2 is an exemplary CMP system with multiple L3 caches.

To reduce L3 access latency, the CMP system can use multiple small L3 caches rather than a shared big L3 cache. FIG. 2 shows a CMP system that comprises four CPU cores (2-10, 2-11, 2-12, and 2-13), wherein each CPU core accesses a private L2 cache (2-20, 2-21, 2-22, and 2-23). There are four L3 caches (2-30, 2-31, 2-32, and 2-33), which correspond to the four L2caches, respectively. The interconnection 2-4 provides communication channels that allow data transfers between the L2 caches and the L3 caches. From the perspective of an L2 cache, compared with having a big shared L3 cache, having multiple smaller L3 cache generally means lower access latency at the expense of lower cache hit rate.

For the purposes of the present invention, each L2 cache is identified as either local or remote with respect to a given CPU core. Referring to FIG. 2, for example, L2 cache 2-20 is considered local to CPU core 2-10, but remote to CPU cores 2-11, 2-12 and 2-13. Similarly, CPU core 2-10 is considered local to L2 cache 2-20, but remote to L2 caches 2-21, 2-22 and 2-23. For a given CPU core, a local L2 cache is closer than a remote L2 cache, and thus has lower access latency than a remote L2 cache.

Each L2 cache can access any of the L3 caches, wherein different L3caches may have different access latencies. It should be appreciated that the local and remote distinction can also be applied to L2 and L3 caches: an L3cache can be identified as either local or remote to a given L2 cache, and an L2 cache can be identified as either local or remote to a given L3 cache. Referring again to FIG. 2, for example, L3 cache 2-30 is considered local to L2 cache 2-20, but remote to L2 caches 2-21, 2-22 and 2-23. Likewise, L2cache 2-20 is considered local to L3 cache 2-30, but remote to L3 caches 2-31, 2-32 and 2-33. For a given L2 cache, a local L3 cache generally has lower access latency than a remote L3 cache.

Although four CPU cores and four L2 caches are depicted in the exemplary CMP system, it should be recognized by those skilled in the art that the system may comprise any number of CPU cores and any number of L2caches. Further, it should be appreciated by those skilled in the art that the present invention is not limited to CMP systems. For example, the present invention can be applied to an SMP system in which L2 and L3 caches are placed on multiple chips. It should also be understood by those skilled in the art that, although the present invention is described in a memory hierarchy with L2 and L3 caches, it can be applied to any cache level in the memory hierarchy.

Figure 3:
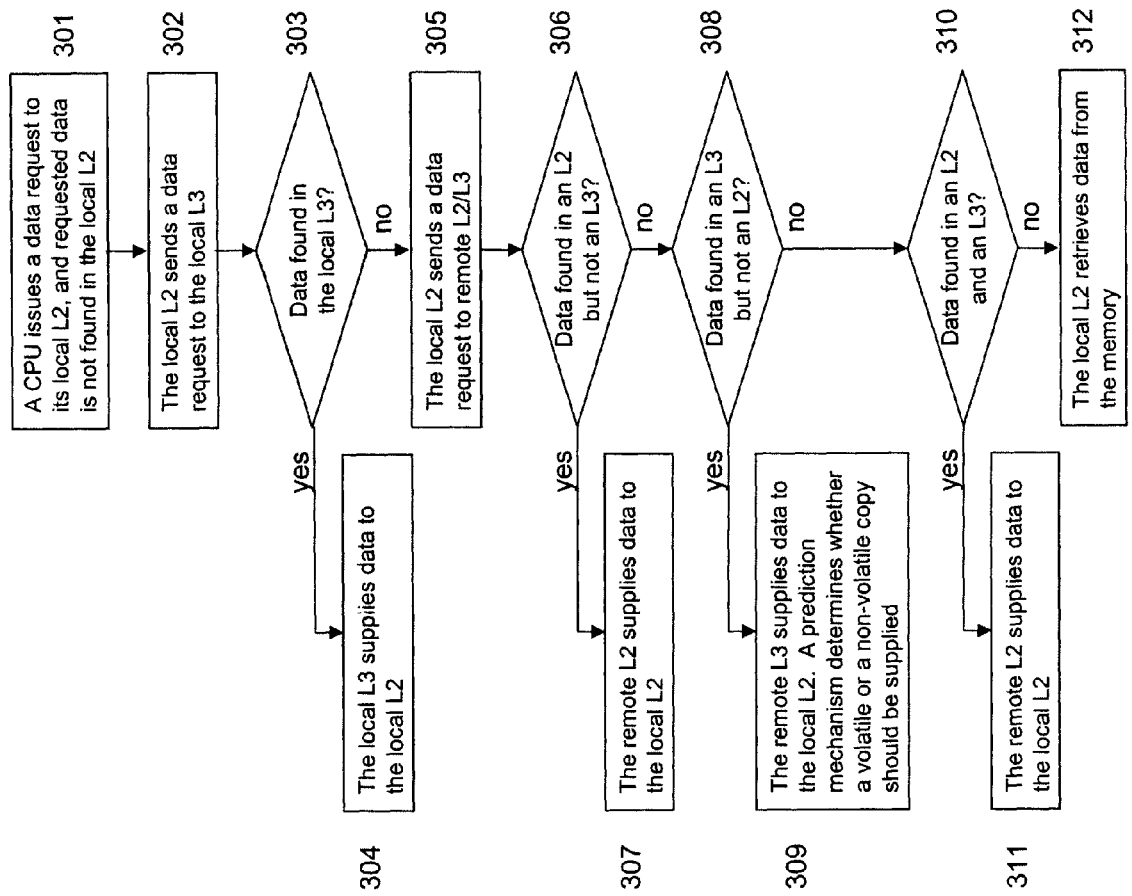
FIG. 3 is a flowchart illustrating cache operations for servicing an L2 read cache miss in a CMP system with multiple L3 caches.

FIG. 3 illustrates cache operations for servicing a read miss in an L2cache in the CMP system shown in FIG. 2. The process starts when a CPU core sends a data request to the corresponding local L2 cache, and the data is not present in the local L2 cache (Step 301). The local L2 cache sends a data request to the corresponding local L3 cache (Step 302). If the data is found in the local L3 cache (Step 303), the local L3 cache supplies the requested data to the local L2 cache (Step 304). If the data is not found in the local L3 cache, the local L2 cache sends a data request to the remote L2 and L3 caches (Step 305). The data request can be sent in parallel to all remote L2 and L3 caches, to just remote L2 caches then remote L3 caches, or serially to each individual remote L2 and L3 cache. An appropriate cache coherence mechanism can be used to determine whether the data is cached in a remote L2 or L3 cache.

If the data is found in a remote L2 cache but not in any remote L3cache (Step 306), the remote L2 cache can supply the data (Step 307). If the data is found in a remote L3 cache but not in any remote L2 cache (Step 308), then the remote L3 cache can supply the data (Step 309). If the data is found in a remote L2 cache and in a remote L3 cache (Step 310), it needs to be determined whether the remote L2 cache or the remote L3 cache should supply the data. If retrieving data from the remote L2 cache is faster than retrieving data from the remote L3 cache, it is preferable to let the remote L2cache supply the data (Step 311). If the data is not found in any of the remote L2 and L3 caches, the requested data can be retrieved from the memory (Step 312).

It should be appreciated by those skilled in the art that, when a cache line is replaced from an L2 cache, it needs to be determined whether data of the replaced cache line should be written back to the corresponding local L3cache. If the replaced cache line contains modified data, the data needs to be written back to the local L3 cache. However, if the replaced cache line contains unmodified data, neither writing the unmodified data back to the local L3 cache nor discarding the unmodified data can compromise soundness of the system. If the unmodified data is always discarded without writing back to the local L3 cache, the L2 cache may need to retrieve the data from a remote L3 if the L2 cache accesses the data again in the future. On the other hand, if the unmodified data of is always written back to the local L3 cache, the L3 cache may cache data that will not be accessed by the local L2 cache (the data may be cached in another L3 cache at the same time). This unwise data replication may inevitably reduce overall cache hit rates of the L3 caches.

According to the present invention, when an L3 cache supplies a shared copy to a remote L2 cache, the L3 cache can supply either a volatile or a non-volatile copy. The distinction between a volatile copy and a non-volatile copy determines whether data write-back should be performed when later the shared copy is replaced from the L2 cache. When a cache line replacement occurs, a volatile copy is flushed from the L2 cache without being written back to the corresponding local L3 cache. This is in contrast to a non-volatile copy which is written back to the corresponding local L3 cache when it is replaced in the L2 cache.

If the L3 cache always supplies a non-volatile copy, unnecessary data replication at the L3 level may reduce L3 cache hit rates. Alternatively, the L3 cache can choose to always supply a volatile copy. Although this would prevent data from being replicated at the L3 level, latency of servicing an L2 miss may suffer.

In the present invention, when an L3 cache supplies data to a remote L2 cache, the L3 cache can adaptively determine whether it should supply a volatile copy or a non-volatile copy. To enable this flexibility, each L3 cache can employ a volatile-prediction mechanism that can predict whether a volatile or non-volatile copy should be supplied. Returning now to step 309 of FIG. 3, when the remote L3 cache needs to supply data, the volatile-prediction mechanism determines whether a volatile or a non-volatile copy should be supplied.

An exemplary volatile-prediction mechanism comprises a 2-bit access flag for each cache line in the L3 cache, wherein the access flag indicates which L2 cache has recently accessed the cache line. Without losing generality, it is assumed that each L2 cache has an identifier, from 0 to 3. If there are more than four L2 caches, an access flag would need more than two bits to indicate which L2 cache has recently accessed the cache line. When the L3 cache receives a data request from a remote L2 cache, if the access flag matches the cache identifier of the remote L2 cache, the L3 cache supplies a non-volatile copy; otherwise, the L3 cache supplies a volatile copy. In addition, each time data is supplied to an L2 cache (local or remote), the prediction mechanism sets the access flag of the cache line to be the identifier of the L2 cache. This volatile-prediction mechanism allows the L3 cache to supply a non-volatile copy to a remote L2 cache only when data of the cache line in the L3 cache has been accessed twice consecutively by the remote L2 cache.

Figure 4:
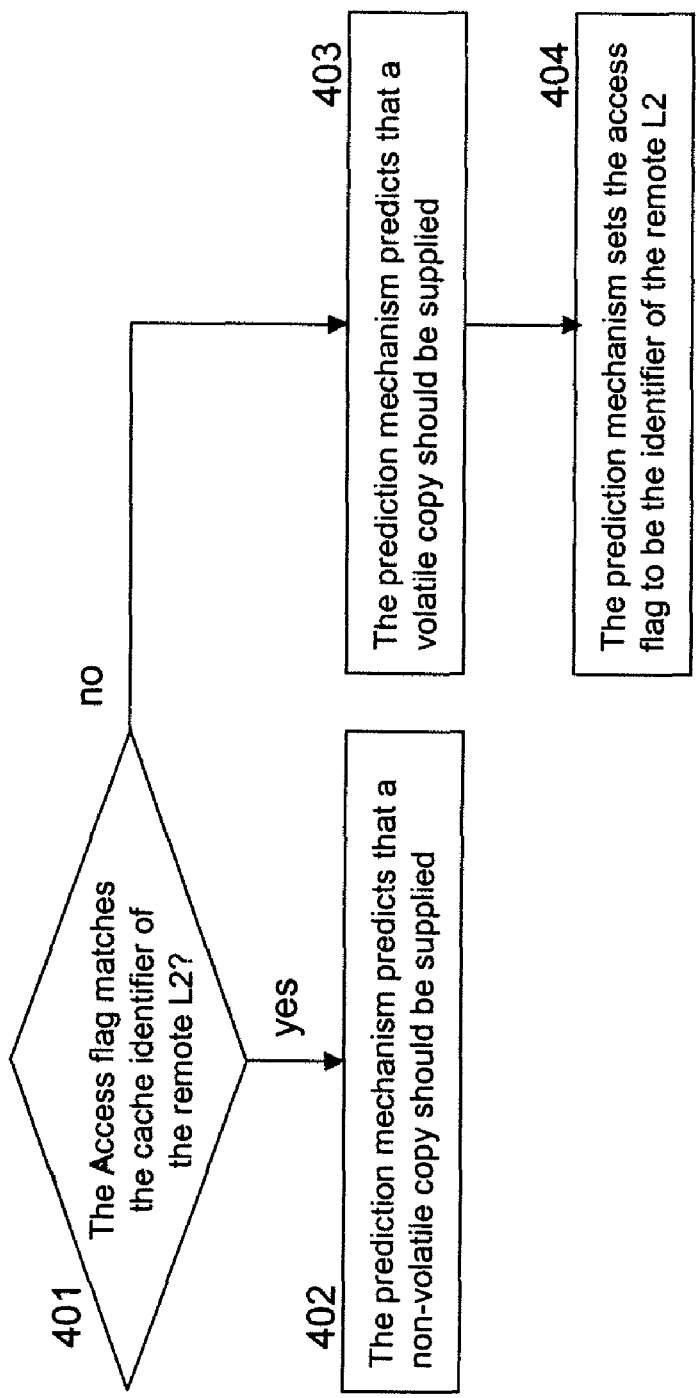
FIG. 4 is a flowchart illustrating prediction operations of an exemplary volatile-prediction mechanism.

The prediction process is illustrated in the flowchart shown in FIG. 4. When an L3 cache needs to supply a shared copy to a remote L2 cache, if the access flag of the corresponding cache line matches the cache identifier of the remote L2 cache (Step 401), the volatile-prediction mechanism predicts that the L3 cache should supply a non-volatile copy (Step 402). However, if the access flag does not match the cache identifier of the remote L2 cache, the prediction mechanism predicts that the L3 cache should supply a volatile copy (Step 403). Meanwhile, the prediction mechanism sets the access flag to be the cache identifier of the remote L2 cache (Step 404).

Another exemplary volatile-prediction mechanism comprises a 1-bit access flag for each cache line in the L3 cache, wherein the access flag indicates whether a remote L2 cache has recently accessed the cache line. When data is brought into the L3 cache, the access flag of the cache line is initialized to 0. When the L3 cache receives a data request from a remote L2 cache, if the access flag of the cache line is 0, the L3 cache supplies a volatile copy; otherwise, the L3 cache supplies a non-volatile copy. Each time data is supplied to the corresponding local L2 cache, the prediction mechanism sets the access flag to be 0; each time data is supplied to a remote L2 cache, the prediction mechanism sets the access flag to be 1. This volatile-prediction mechanism allows the L3 cache to supply a non-volatile copy when data of the cache line in the L3 cache has been accessed twice consecutively by one or more remote L2 caches (although not necessarily the same remote L2 cache).

It should be noted that, when an L3 cache supplies data to a remote L2 cache, the L3 cache may flush the cache line from the L3 cache, or keep the cache line in the L3 cache. If the cache line remains in the L3 cache, the L3 cache can tweak the least-recently-used (LRU) status of the cache line appropriately. For example, the L3 cache can make the cache line the most-recently-used (MRU) line so that the cache line is less likely to be replaced from the L3 cache. Alternatively, the L3 cache can make the cache line the LRU line so that the cache line is more likely to be replaced from the L3 cache. The L3 cache can also choose not to make any LRU status change for the cache line.

It should be noted that, when a remote L2 cache supplies a shared copy, the remote L2 cache can also determine whether a volatile copy or a non-volatile copy should be supplied. The remote L2 cache can simply choose to always supply a volatile copy, or always supply a non-volatile copy. An adaptive approach is to allow the remote L2 cache to determine whether a volatile or a non-volatile copy should be supplied. To enable this flexibility, each L2 cache can use a volatile-prediction mechanism, similar to the one used for each L3 cache as described above.

According to the present invention, each L2 cache can also comprise a volatile-promotion mechanism that can adaptively promote a cache line from volatile to non-volatile. For example, the promotion may happen if the cache line is accessed so frequently that if it needs to be replaced from the L2 cache, it is desirable that the data can be later retrieved from the local L3 cache rather than a remote L3 cache. The volatile-promotion mechanism makes sense if there is no room in the L3 cache directory for implementing a volatile-prediction mechanism, or if the difference between local and remote L3 cache latencies is high enough that avoiding additional remote L3 cache access is advantageous.

An exemplary volatile-promotion mechanism comprises an access counter associated with each cache line in the L2 cache, wherein the access counter indicates the number of times the cache line has been accessed by the corresponding CPU core. The access counter is initialized to 0 when a volatile copy is brought into the L2 cache; and incremented by 1 each time the data is supplied from the L2 cache to the corresponding CPU core. If the access counter reaches a promotion-threshold (e.g. 7), the volatile-promotion mechanism promotes a volatile copy to a non-volatile copy.

The L2 cache can also use the volatile-promotion mechanism to demote a non-volatile copy to a volatile copy. With the exemplary volatile-promotion mechanism described above, for example, when a non-volatile cache line is replaced from the L2 cache, if the corresponding access counter is below a demotion-threshold (e.g. 3), it indicates that the cache line has not been frequently accessed by the corresponding CPU core since the data is brought into the L2 cache. As a result, the volatile-promotion mechanism can demote the data copy from non-volatile to volatile, so that the L2 cache would flush the data copy without writing it back to the corresponding L3 cache.

It should be noted that an appropriate global adaptive mechanism can be used for steering volatile and non-volatile decisions. A global adaptive mechanism can collect cache profiling information such as cache hits and misses within an interval and then suggest proper modification of volatile-prediction and volatile-promotion policies (e.g. adjustments of the promotion-threshold and the demotion-threshold). This enables the system to adapt to different workloads. For example, if the working set is small enough to fit in the local L3 cache, it would be advantageous to have more non-volatile copies. However, if the local L3 cache is under severe pressure and significant sharing is found between L3 caches, it would be better to have more volatile copies so that the working set can be spread across L3 caches.

It should be appreciated by those skilled in the art that the concept of adaptively supplying volatile and non-volatile copies also makes sense with a shared L3 cache. Consider the CMP system shown in FIG. 1. When a cache miss occurs in an L2 cache, it sends a cache request to search the shared L3 cache and all peer L2 caches. The L2 cache may search the peer L2 caches and the shared L3 cache in parallel to reduce cache access latency.

When the shared L3 cache supplies data to an L2 cache, the cache line can be invalidated from the L3 cache to avoid unnecessary data replication between L2 and L3 caches (alternatively, the LRU status of the cache line can be adjusted so that the cache line in the L3 cache is more likely to be replaced compared with other cache lines in the same cache line set).

When an L2 cache line is replaced, the data may need to be written back to the shared L3 cache if the data is currently not cached in the shared L3 cache. If the L2 cache writes data of a replaced shared cache line back to the shared L3 cache, and if the data has already been written back by another L2 cache, the unnecessary write-back operation is a waste of bandwidth between the L2 cache and the L3 cache. This can become a serious problem if the bandwidth between L2 and L3 caches is limited (e.g., if the shared L3 cache is on a different chip).

In an illustrative embodiment of the present invention, an enhanced cache coherence protocol ensures that, for data that is shared in multiple L2 caches, at most one non-volatile copy can be cached, while all other shared copies are volatile. The non-volatile shared copy is considered the "owner" that is responsible for an L3 cast-out. In other words, when a shared cache line is replaced from an L2 cache, the data is written back to the shared L3 cache only if the cache line in the L2 cache is non-volatile.

Consider a scenario in which data of a memory address is initially not present in any L2 cache. When a read cache miss occurs in a first L2 cache, the first L2 cache receives a non-volatile shared copy from the L3 cache, while the cache line in the L3 cache is invalidated. If later a read cache miss occurs in a second L2 cache, the second L2 cache can receive a volatile shared copy from the first L2 cache, while the first L2 cache maintains its non-volatile shared copy. Alternatively, the second L2 cache can receive a non-volatile shared copy from the first L2 cache, while the first L2 cache downgrades its shared copy from non-volatile to volatile.

It should be noted that, when a non-volatile copy is replaced from an L2 cache, one or more volatile copies of the memory address may exist in other L2 caches. As a result, writing data of the replaced non-volatile copy back to the shared L3 cache allows data to be cached in one or more L2 caches and the shared L3 cache at the same time. However, compared with the approach that always writes data of a replaced L2 cache line back to the shared L3 cache, the technique described in this illustrative embodiment can significantly reduce data replication between L2 caches and the shared L3 cache. It is important to note that this improvement is realized without generating additional cache snoop operations for peer L2 caches.

Figure 5:
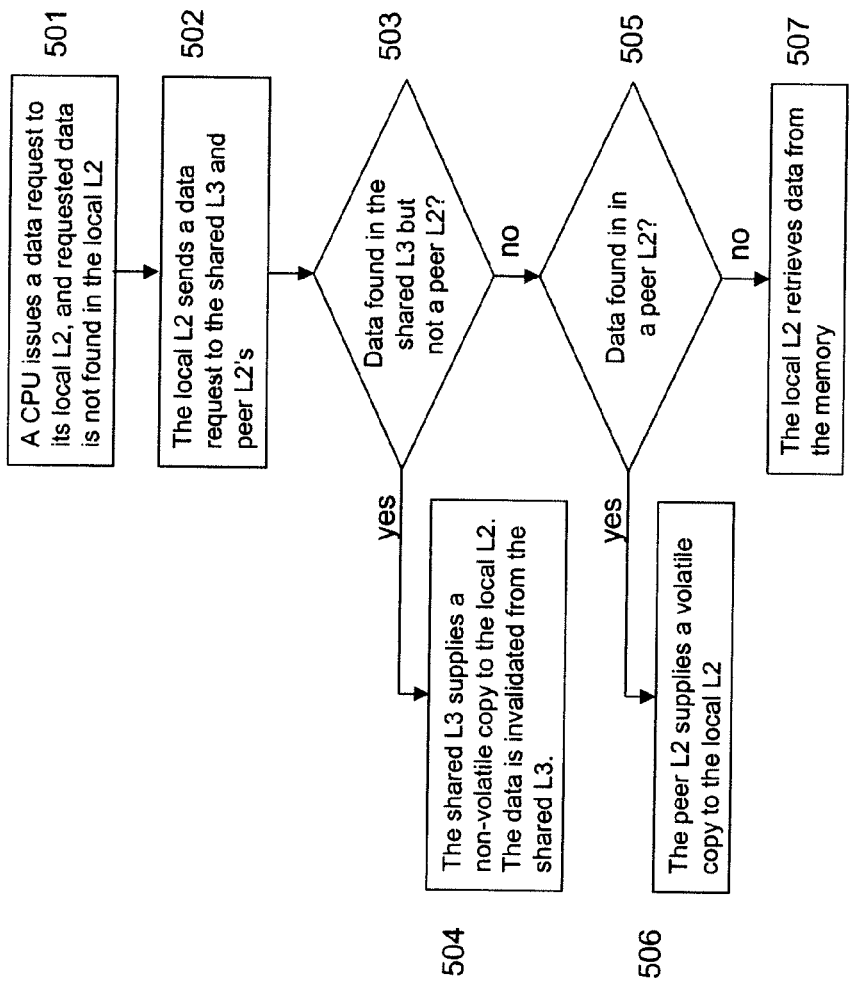
FIG. 5 is a flowchart illustrating cache operations for servicing an L2 read cache miss in a CMP system with a shared L3 cache.

FIG. 5 illustrates cache operations for servicing a read miss in an L2 cache in the CMP system with a shared L3 cache. The process starts when a CPU core sends a data request to the corresponding local L2 cache, and the data is not present in the local L2 cache (Step 501). The local L2 cache sends a data request to the shared L3 cache and the peer L2 caches (Step 502). If the data is found in the shared L3 cache but not in any peer L2 cache (Step 503), the shared L3 cache supplies a non-volatile copy to the (requesting) local L2 cache (Step 504). Meanwhile, data of the cache line can be invalidated from the shared L3 cache. Otherwise, if the data is found in a peer L2 cache (Step 505), the peer L2 cache can supply a volatile copy to the (requesting) local L2 cache (Step 506). If the data is not found in the shared L3 cache and any of the peer L2 caches, the requested data is retrieved from the memory (Step 507).

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. A method for adaptively supplying volatile or non-volatile data copies in a computing environment, comprising the steps of:
   determining that a first memory component in a memory hierarchy needs to supply a data copy of a memory address to a second memory component in the memory hierarchy;
   generating a prediction result according to a prediction policy, the prediction result indicating whether the data copy should be volatile or non-volatile;
   supplying the data copy from the first memory component to the second memory component according to the prediction result.

2. The method of claim 1, further comprising the steps of:
   generating a promotion decision according to a promotion policy, the promotion decision indicating whether the data copy in the second memory component should be promoted from volatile to non-volatile, if the data copy is volatile in the second memory component;
   changing the data copy in the second memory component from volatile to non-volatile according to the promotion decision.

3. The method of claim 2, further comprising the steps of:
   generating a demotion decision according to a demotion policy, the demotion decision indicating whether the data copy in the second memory component should be demoted from non-volatile to volatile, if the data copy is non-volatile in the second memory component;
   changing the data copy in the second memory component from non-volatile to volatile according to the demotion decision.

4. The method of claim 3, wherein if the data copy is replaced from the second memory component, the first memory component performs a data write-back operation only if the data copy is non-volatile.

5. The method of claim 4, wherein the data write-back operation writes the data copy from the second memory component back to one of the first memory component or a third memory component in the memory hierarchy.

6. The method of claim 5, wherein the first memory component is a high-level cache, and the second memory component is a low-level cache.

7. The method of claim 5, further comprising the steps of:
   collecting profiling information of accesses to the memory address in the memory hierarchy; and
   adjusting at least one of (1) the prediction policy, (2) the promotion policy, and (3) the demotion policy, according to the profiling information.

8. A computer readable medium encoded with instructions for promoting data copies from volatile data to non-volatile in a computing environment comprising the steps of:
   determining that a first memory component in a memory hierarchy needs to supply a data copy of a memory address to a second memory component in the memory hierarchy;
   generating a prediction result according to a prediction policy, the prediction result indicating whether the data copy should be volatile or non-volatile;
   supplying the data copy from the first memory component to the second memory component according to the prediction result.

9. A method for adaptively supplying data copies between a high level cache and a low level cache memory in a computing environment which includes a cache memory having a high level cache memory arranged to store a plurality of high level cache lines and a low level cache memory connected to the high level cache memory by an interconnection, wherein the low level cache memory comprises a plurality of memory components, each of the memory components storing a plurality of low level cache lines, wherein each of the memory components has a unique identifier, comprising the steps of:

maintaining an access flag for each of said plurality of high level cache lines using a prediction mechanism, wherein the prediction mechanism updates the access flag in response to the low-level cache accessing the high level cache line, the update based on the identifier of the memory components of the low level cache performing the access, and wherein the prediction mechanism outputs a volatility flag associated with the accessed high level cache line, the volatility flag having a range of values including a volatile value and a non-volatile value, wherein the value is set based on the updated access flag and on said access flag prior to the update;

receiving in the low level cache memory, as a data copy in one of the low level cache lines, a high level cache line accessed in the high level cache memory;

storing, in a manner associated with the data copy, the volatility flag output by the prediction mechanism associated with the accessed high level cache line; and performing a selective write-back of data copies stored in the low level cache lines, back into the high level cache memory, based on the value of the volatility flags associated with the copies, the selective write-back writing the data copy back into the high level cache memory if the volatility flag has the non-volatile value and the selective write-back not writing the data copy back into the high level cache memory if the volatility flag has the volatile flag value.

10. The system of claim 9, wherein the low-level cache memory is an L2 (Level 2) cache, and the high-level cache memory is an L3 (Level 3) cache.

11. The method of claim 9, wherein the prediction mechanism used in the maintaining step is arranged to compare the identifiers of the memory components accessing the high level cache with the access flags associated with the accessed high level cache line and, based on the comparison, to determine if the same memory component has consecutively accessed the same high level cache line, and is arranged to output the volatility flag for the data copy at the non-volatile flag value only if the comparison determines said consecutive access.

12. The method of claim 9, wherein at least one of the memory components of the low level cache memory is arranged local to the high level cache memory and at least one of the memory components of the low level cache memory is arranged remote from the high level cache memory, and wherein the prediction mechanism used in the maintaining step is arranged to compare the identifiers of the memory components accessing the high level cache with the access flags associated with the accessed high level cache line and, based on the comparison, to deteunine if any of the remote memory components has consecutively accessed the same high level cache line, and is arranged to output the volatility flag for the data copy at the non-volatile flag value only if the comparison determines said consecutive access.

* * * * *